(12) United States Patent
Fernald

(10) Patent No.: US 8,931,520 B2
(45) Date of Patent: Jan. 13, 2015

(54) PIPE WITH INTEGRATED PROCESS MONITORING

(75) Inventor: Mark R. Fernald, Enfield, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 1164 days.

(21) Appl. No.: 12/920,941

(22) PCT Filed: Mar. 9, 2009

(86) PCT No.: PCT/US2009/036504
§ 371 (c)(1),
(2), (4) Date: Nov. 1, 2010

(87) PCT Pub. No.: WO2009/111777
PCT Pub. Date: Sep. 11, 2009

(65) Prior Publication Data
US 2011/0036439 A1 Feb. 17, 2011

Related U.S. Application Data

(60) Provisional application No. 61/034,676, filed on Mar. 7, 2008.

(51) Int. Cl.
*F16L 55/00* (2006.01)
*G01F 1/66* (2006.01)
*G01F 1/708* (2006.01)
*G01F 15/00* (2006.01)

(52) U.S. Cl.
CPC .............. *G01F 1/662* (2013.01); *G01F 1/666* (2013.01); *G01F 1/7082* (2013.01); *G01F 15/006* (2013.01)

USPC .......................................................... 138/104

(58) Field of Classification Search
CPC ....... G01F 1/662; G01F 1/666; G01F 1/7082; G01F 15/006
USPC .......................................................... 138/104
See application file for complete search history.

(56) References Cited

U.S. PATENT DOCUMENTS

| 6,354,147 B1 | 3/2002 | Gysling et al. |
| 6,539,981 B1 | 4/2003 | Kleven et al. |
| 7,249,525 B1 | 7/2007 | Engel |
| 2001/0029989 A1* | 10/2001 | Paz ................................ 138/104 |
| 2009/0077982 A1* | 3/2009 | Brower .......................... 62/50.7 |

FOREIGN PATENT DOCUMENTS

| DE | 3633306 | * 3/1988 | ............... G01F 1/66 |
| GB | 855650 | 12/1960 |

OTHER PUBLICATIONS

2 Pages PCT/US2009/036504 International Search Report mailed May 29, 2009.

* cited by examiner

*Primary Examiner* — J. Casimer Jacyna

(57) ABSTRACT

The present invention provides a pipe featuring an inner core; an outer pipe wall; and measurement instrumentation configured or arranged between the inner core and outer pipe wall, and also configured to respond to one or more process variables related to media flowing in the pipe and to provide a signal containing information about the one or more process variables. The pipe may include a pipe liner configured inside the outer pipe wall, where the measurement instrumentation in configured on the inside of the pipe liner.

17 Claims, 2 Drawing Sheets

PIPE WITH INTEGRATED PROCESS MONITORING

CROSS-REFERENCE TO RELATED APPLICATIONS

This application claims benefit to international patent application serial no. PCT/US2009/036504, filed 9 Mar. 2009, which claims benefit provisional patent application Ser. No. 61/034,676, filed 7 Mar. 2008, which are all incorporated by reference in their entirety.

BACKGROUND OF THE INVENTION

1. Field of Invention

This invention relates to a technique for monitoring one or more process variables of media flowing in a pipe; and more particularly relates to a technique for monitoring one or more process variables of media flowing in a pipe having a liner therein.

2. Description of Related Art

In processes where erosion of process pipes occur at high rates (i.e. Oil Sands slurry transport), lined piping has shown improved resistance to wear, as shown in FIG. 1.

There are known techniques for measuring flow rate and/or wall thickness to predict when a pipe should be replaced. For example, FIG. 2 shows one such known technique where a piezo polymer may be arranged on a pipe wall. However, in operation when a voltage signal causes a piezo polymer pulse, it will reflect off a rubber intermediate layer, but there is little or no energy reflected back off the liner, which could be used to measure the flow rate or pipe wall thickness, among other process variables, using the known technique.

Because of this, the benefit of lined pipe is offset by the difficulty in measuring the pipe wall thickness to predict when the pipe should be replaced, despite the improved wear rate. Failure to replace the pipe at the appropriate time can lead to ruptures and process down time. Standard wall thickness measurement techniques are inadequate due to the construction of the lined pipe. The ultrasonic pulse does not couple well to the inner lining because of the acoustic impedance mismatch. Many lined pipe design further complicate the problem by using a soft compliant layer between the outer metal and the inner core of the pipe.

For all these reasons, there is a need in the industry for a way for measuring flow rate and/or wall thickness in a lined pipe in order to predict when a pipe should be replaced.

SUMMARY OF THE INVENTION

The present invention provides a pipe featuring an inner core; an outer pipe wall; and measurement instrumentation configured or arranged between the inner core and outer pipe wall. In operation, the measurement instrumentation is configured to respond to one or more process variables related to media flowing in the pipe and to provide a signal containing information about the one or more process variables. By way of example, the measurement instrumentation may be configured to measure flow rate, pipe wall thickness, or some combination thereof, as well as to measure other process variables including mechanical diagnostics for pump and valve actuation.

According to some embodiments of the present invention, the pipe may include a pipe liner configured inside the pipe wall, where the measurement instrumentation is configured on the inside of the pipe liner. The pipe liner may be made or formed out of an elastic substance, such as rubber.

According to some embodiments of the present invention, the measurement instrumentation may include a piezo-polymer sensor that may be configured or situated on an inner wall of the pipe liner. In operation, the piezo-polymer sensor may be configured to respond to an input voltage signal and provide a piezo polymer pulse, and also to respond to a reflected piezo polymer pulse and provide a reflected piezo polymer pulse signal containing information about the reflected piezo polymer pulse. In effect, the aforementioned signal containing information about the one or more process variables takes the form of the reflected piezo polymer pulse signal being returned from the piezo-polymer sensor. The piezo-polymer sensor may include polymers that are thin and can be placed directly on the inner wall of the pipe liner without substantially impacting the shape or form of the pipe. Alternatively, the piezo-polymer sensor may be integrated directly into the inner wall of the pipe liner.

According to some embodiments of the present invention, the outer pipe wall may be made of metal or some other suitable material, such as PVC.

According to some embodiments of the present invention, the measurement instrumentation may include other process monitoring sensors or systems, including by way of example a sonar array flow meter. The sonar array flow meter may include one or more transducers configured to measure flow, gas volume fraction, other process parameters, or some combination thereof. The other process monitoring sensor or system may comprise a hardwire connection configured to respond to transducer excitations and provide a hardwire connection signal containing information about the transducer excitations. The hardwire connection may include a feedthru or a wireless configuration. The pipe liner may be configured to cover an inner surface of the pipe wall.

The one or more process variables related to media flowing in the pipe may include one or more structural characteristics of the pipe itself caused by the media flowing in the pipe, including pipe wall thickness, or the flow rate of the media.

The inner core may be configured to be resistant to wear caused by the media flowing in the pipe.

The measurement instrumentation may be configured so as to be equally spaced circumferentially arranged on the inside of the inner core or pipe liner.

According to some embodiments of the present invention, the present invention may also take the form of a pipe liner itself for configuring inside a pipe wall of a pipe, featuring measurement instrumentation configured on the inside of the pipe liner, where the measurement instrumentation is configured to respond to the one or more process variables related to media flowing in the pipe and to provide the signal containing information about the one or more process variables.

In effect, the present invention provides for the integration of measurement instrumentation into the inner wall of lined piping. This instrumentation can be used to measure flow rate and wall thickness along with other process variables such as mechanical diagnostics for pumps, and valve actuation.

Additionally, other process measurement sensors or systems such as a sonar array flow meter can be implemented in the same manner using similar transducers to measure flow, gas volume fraction, and other process parameters.

One advantage of the present invention is that the situation or configuration of the piezo-polymer sensor on the inside of the pipe liner circumvents the acoustic impedance problem known in the art.

BRIEF DESCRIPTION OF THE DRAWING

The drawing includes FIGS. 1-4, which are not drawn to scale, as follows.

DETAILED DESCRIPTION OF BEST MODE OF THE INVENTION

Figure 1:
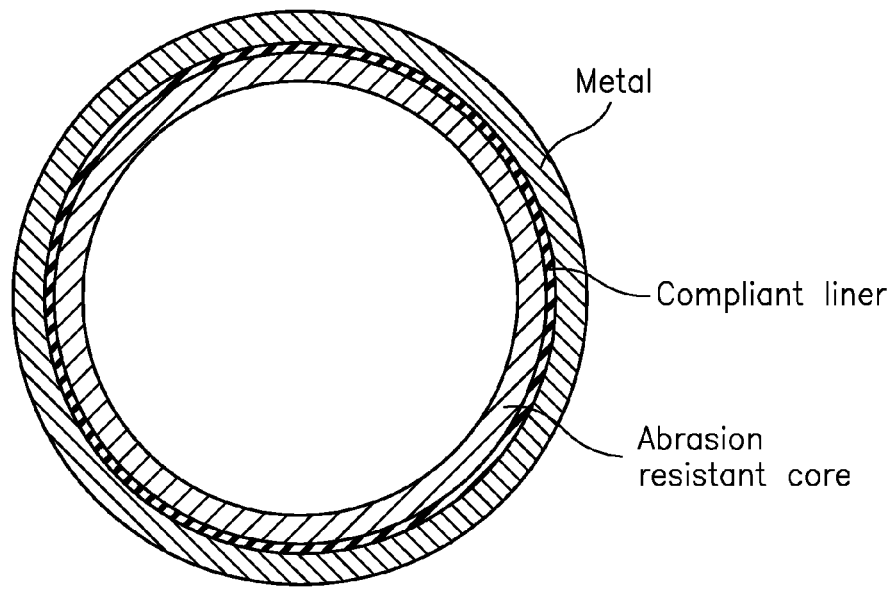
FIG. 1 is a diagram of a lined pipe that is known in the art.
Figure 2:
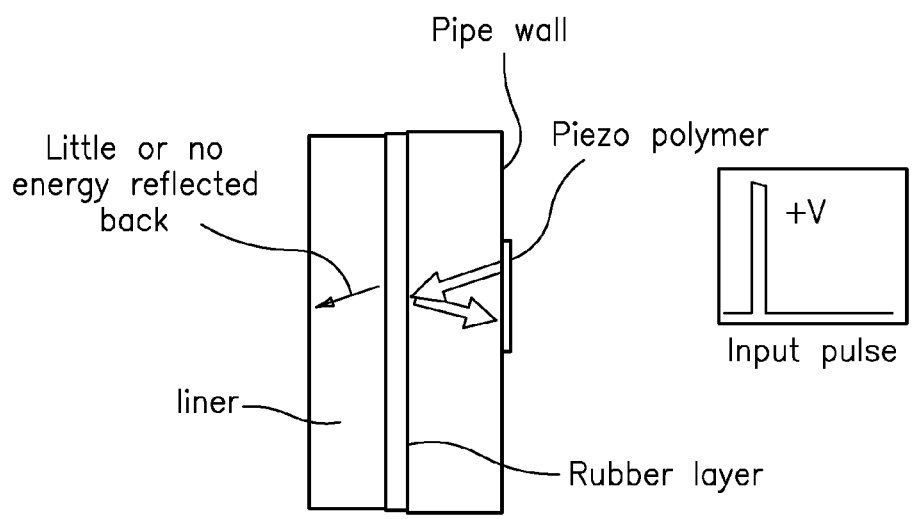
FIG. 2 is a diagram of a portion of a known lined pipe, illustrating a drawback of the current technology.
Figure 3:
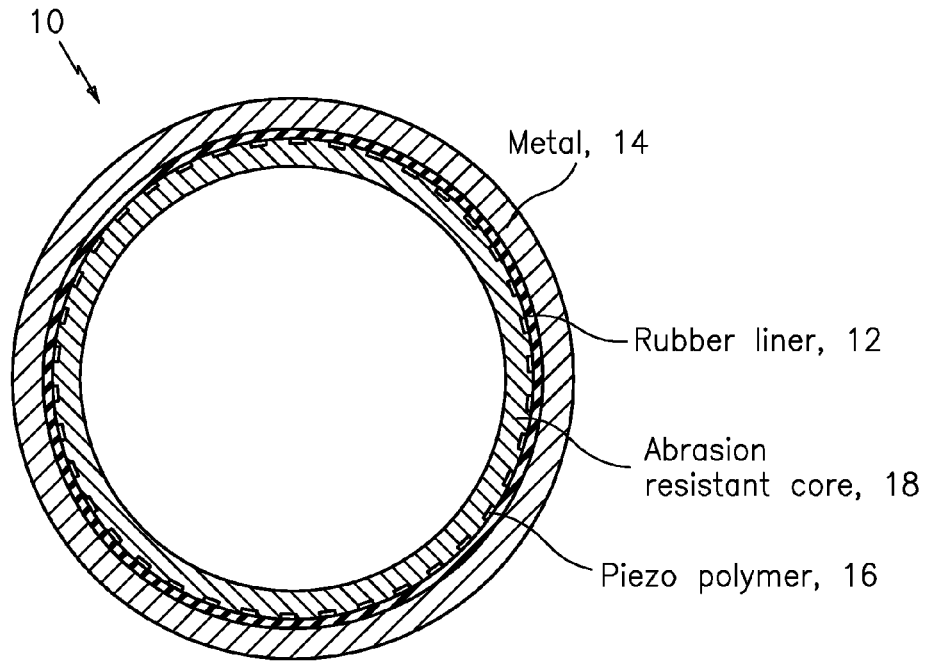
FIG. 3 is a diagram of a lined pipe according to the present invention.

FIG. 3 shows a pipe generally indicated as 10 featuring an outer pipe wall 14; an inner core 18; and measurement instrumentation 16 configured or arranged between the outer pipe wall 14 and the inner core 18. In operation, the measurement instrumentation 16 is configured to respond to one or more process variables related to media flowing in the pipe and to provide a signal containing information about the one or more process variables. As a person skilled in the art would appreciate, the inner core 18 typically forms part of a lined pipe and is abrasion resistant to media flowing in the pipe 10.

According to some embodiments of the present invention, the pipe 10 may include a pipe liner 12 configured or arranged between the outer pipe wall 14 and the inner core 18, where the measurement instrumentation 16 is configured on an inside wall of the pipe liner 12.

Figure 4:
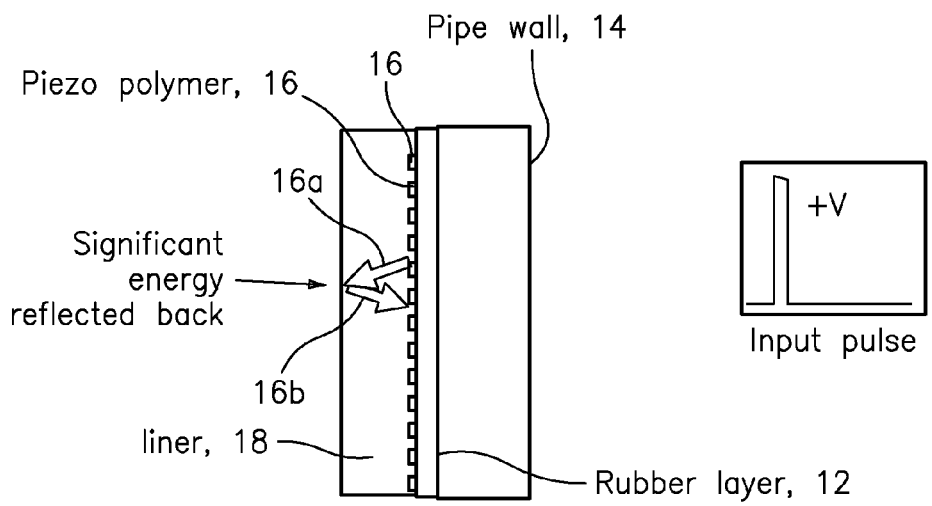
FIG. 4 is a diagram of a portion of a lined pipe according to the present invention, illustrating that significant energy is reflected back off the inner core or liner which can be used to measure flow rate, pipe wall thickness, as well as other process variables.

According to some embodiments of the present invention, the measurement instrumentation 16 may take the form of a piezo-polymer sensor 16 as shown in FIGS. 3-4 that may be configured or situated on an inner wall of the pipe liner 12. Although the present invention is shown and described in relation to the measurement instrumentation 16 taking the form of the piezo-polymer sensor 16, the scope of the embodiment is also intended to include other types or kinds of measurement instrumentation either now known or later developed in the future.

In FIGS. 3-4, the pipe liner 12 is shown made of an elastic material, such as rubber, and arranged in-between the inner core 18 and the outer pipe wall 14. The scope of the embodiment is also intended to include using other types or kinds of materials for the liner other than rubber.

According to some embodiments of the present invention, the measurement instrumentation 16, such as the piezo-polymer sensor 16, may be configured or arranged in-between the inner core 18 and outer pipe wall 14, e.g. by adapting the piezo-polymer sensor 16 directly in or on the inner core 18 itself, thus eliminating in whole or in part the need for an intermediate liner or layer like element 12.

In operation, as shown in FIG. 4, the piezo-polymer sensor 16 may be configured to respond to an input signal, such as a voltage signal V, and provide a piezo polymer pulse as indicated by the arrow 16a, and also to respond to a reflected piezo polymer pulse as indicated by the arrow 16b that contains significant energy reflected back off the inner wall of the inner core 18 as shown and provide a reflected piezo polymer pulse signal containing information about the reflected piezo polymer pulse. In effect, the aforementioned signal containing information about the one or more process variables takes the form of the reflected piezo polymer pulse signal being returned from the piezo-polymer sensor 16 back to some processor device (not shown). The piezo-polymer sensor 16 may include, or take the form of, polymers that are thin and can be placed directly on the inner wall of the pipe liner 12 without substantially impacting the shape or form of the pipe 10. Alternatively, in some embodiments of the present invention, the piezo-polymer sensor 16 may be integrated directly into the inner wall of the pipe liner 12.

The measurement instrumentation 16 may be configured to measure flow rate, pipe wall thickness, or some combination thereof, as well as to measure other process variables including mechanical diagnostics for pump and valve actuation. In operation, the measurement instrumentation 16 provides a signal containing information about such measurements related to flow rate, pipe wall thickness, or some combination thereof, as well as to other process variables including mechanical diagnostics for pump and valve actuation, to, e.g., some processing device (not shown) that uses the information contained in the signal for determining the flow rate, pipe wall thickness, or some combination thereof, as well as to measure other process variables including mechanical diagnostics for pump and valve actuation. A person skilled in the would appreciate that techniques are known in the art for determining the flow rate, pipe wall thickness, or some combination thereof, as well as the other process variables including mechanical diagnostics for pump and valve actuation, and the scope of the invention is not intended to be limited to any particular type or kind of technique for doing the same either now known or later developed in the future.

In some embodiments of the present invention, the pipe wall 14 may be made of metal, although the scope of the invention is not intended to be limited to the same. The scope of the invention is intended to include the pipe wall 14 being made from other types or kinds of material either now known or later developed in the future, including PVC.

Alternatively, the measurement instrumentation 16 may include other process monitoring sensors or systems, including a sonar array flow meter. The sonar array flow meter may include one or more transducers configured to measure flow, gas volume fraction, other process parameters, or some combination thereof. The other process monitoring sensor or system comprises a hardwire connection configured to respond to transducer excitations and provide a hardwire connection signal containing information about the transducer excitations. The hardwire connection includes a feedthru or a wireless configuration, and the scope of the invention is not intended to be limited to the manner in which the signals are provided to or from the measurement instrumentation 16. For example, a person skilled in the would appreciate that there are many techniques known in the art for providing such an input signal, such as voltage signal V, to the measurement instrumentation, or the signal back from the measurement instrumentation to the processor device (not shown), and the scope of the invention is not intended to be limited to any particular type or kind either now known or later developed in the future.

Moreover, in some embodiments of the present invention, the inner liner 12 may take the form of an abrasion resistant core 18, or the intermediate layer may be the rubber layer or liner 12, or some combination thereof.

The one or more process variables related to media flowing in the pipe 10 may include one or more structural characteristics of the pipe 10 itself either now known or later developed in the future caused by the media flowing in the pipe 10, including, by way of example, the characteristics like pipe wall thickness, as well as the flow rate of the media.

The measurement instrumentation 26 may be configured so as to be equally spaced circumferentially arranged on the inside of the pipe liner 12.

The present invention may also take the form of the pipe liner 12 itself for configuring inside a pipe wall of a pipe, featuring such measurement instrumentation configured on the inside of the pipe liner, and also configured to respond to the one or more process variables related to media flowing in the pipe and to provide the signal containing information about the one or more process variables.

According to some embodiments of the present invention, the present invention may also take the form of positioning the sensor between the piping and a liner within the pipe, including between the casing of a pump and the liner.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A pipe comprising:
an outer pipe wall;
an inner core or pipe liner configured inside the outer pipe wall, and also configured to be resistant to abrasion caused by media flowing in the pipe; and
measurement instrumentation configured or arranged between the inner core or pipe liner and the outer pipe wall, configured to respond to an input voltage signal and provide a measurement instrumentation pulse, and also configured to respond to a reflected measurement instrumentation pulse containing information about one or more process variables related to media flowing in the pipe and to provide a reflected measurement instrumentation pulse signal containing information about the one or more process variables,
wherein the measurement instrumentation comprises a piezo-polymer sensor that is arranged between the inner core or pipe liner and an intermediate liner or layer.

2. A pipe according to claim 1, wherein the piezo-polymer sensor is situated on a wall of the inner core or pipe liner.

3. A pipe according to claim 1, wherein the piezo-polymer sensor is configured to respond to the input voltage signal and provide a piezo polymer pulse, and also to respond to a reflected piezo polymer pulse and provide a reflected piezo polymer pulse signal containing information about the one or more process variables.

4. A pipe according to claim 2, wherein the piezo-polymer sensor includes polymers that are thin and can be placed directly on the wall of the inner core or pipe liner without substantially impacting the shape or form of the pipe.

5. A pipe according to claim 1, wherein the intermediate liner or layer is made of rubber.

6. A pipe according to claim 1, wherein the measurement instrumentation is configured to measure flow rate, pipe wall thickness, or some combination thereof.

7. A pipe according to claim 1, wherein the one or more process variables include mechanical diagnostics for pump and valve actuation.

8. A pipe according to claim 1, wherein the pipe wall is made of metal.

9. A pipe according to claim 1, wherein the inner core or pipe liner is configured to cover an inner surface of the pipe wall.

10. A pipe according to claim 1, wherein the one or more process variables related to media flowing in the pipe include one or more structural characteristics of the pipe itself caused by the media flowing in the pipe, including pipe wall thickness.

11. A pipe according to claim 1, wherein the one or more process variables related to media flowing in the pipe include flow rate of the media.

12. A pipe according to claim 1, wherein the measurement instrumentation is configured so as to be equally spaced circumferentially arranged on the inside of the inner core or pipe liner.

13. A pipe comprising:
an outer pipe wall;
an inner core or pipe liner configured inside the outer pipe wall, and also configured to be resistant to abrasion caused by media flowing in the pipe;
a rubber liner or layer configured between the outer pipe wall and the inner core or pipe liner; and
piezo-polymer sensors configured or arranged between the inner core or pipe liner and the rubber liner or layer, configured to respond to an input voltage signal and provide piezo-polymer sensor pulses, and also configured to respond to reflected piezo-polymer sensor pulses containing information about one or more process variables related to media flowing in the pipe and to provide reflected piezo-polymer sensor pulse signals containing information about the one or more process variables.

14. A pipe according to claim 13, wherein the piezo-polymer sensors are configured on the inside of the inner core or pipe liner or forms an integral part of the inner core or pipe liner.

15. A pipe liner according to claim 13, wherein the piezo-polymer sensors are configured to measure flow rate, pipe wall thickness, or some combination thereof.

16. A pipe according to claim 13, wherein the piezo-polymer sensors are configured so as to be equally spaced circumferentially arranged on the inside of the inner core or pipe liner.

17. A pipe according to claim 13, wherein the piezo-polymer sensors are situated on a wall of the inner core or pipe liner.

* * * * *